United States Patent [19]

Goans

[11] 4,413,651

[45] Nov. 8, 1983

[54] DIAPHRAGM VALVE AND METHOD

[75] Inventor: Kip B. Goans, Harvey, La.

[73] Assignee: Baker Cac, Inc., Belle Chasse, La.

[21] Appl. No.: 295,205

[22] Filed: Aug. 24, 1981

[51] Int. Cl.³ ............................................. F16K 11/02
[52] U.S. Cl. ................................. 137/625.25; 251/331; 251/DIG. 2
[58] Field of Search .......................... 251/331, DIG. 2; 137/625.25

[56] References Cited

U.S. PATENT DOCUMENTS

| | | | |
|---|---|---|---|
| 2,720,378 | 10/1955 | Otto | 251/DIG. 2 |
| 3,208,721 | 9/1965 | McHugh | 251/331 |
| 3,547,157 | 12/1970 | Jacklin | 251/331 X |
| 3,766,933 | 10/1973 | Nicholson | 251/DIG. 2 |
| 3,799,193 | 3/1974 | Greenwood | 137/853 |

Primary Examiner—Alan Cohan

Attorney, Agent, or Firm—Norvell & Associates

[57] ABSTRACT

A method and a valve are provided for opening or closing fluid flow through an annular conduit by the utilization of a flexible diaphragm. Such diaphragm is preferably of annular configuration and has an annular U-shaped portion disposed in the annular fluid conduit. The outer portions of the diaphragm are secured to the outer member defining the annular fluid conduit and the inner portions of the flexible diaphragm are secured to the inner member defining the annular conduit. The annular U-shaped portion contains at least one aperture which is rolled into and out of sealing engagement with either the inner or outer wall of the annular fluid conduit by limited axial movement of one wall relative to the other. In a modification of the invention, a second such diaphragm is employed to provide an opening or closing of a bleed passage for the fluid outlet.

16 Claims, 4 Drawing Figures

DIAPHRAGM VALVE AND METHOD

BACKGROUND OF THE INVENTION

1. Field of the Invention

This invention relates to a valve and a method for opening or closing fluid flow through an annular conduit by the utilization of a flexible diaphragm.

2. Description of the Prior Art

The control of fluid flow by valves is one of the more voluminous areas of prior art. Valve constructions heretofore employed have generally utilized either a poppet configuration or a slide valve. In the poppet valve, a valving member is moved directly away from a valve seat. In the sliding valve construction, the valving member is moved parallel to a seat, generally of an elastomeric material, to open up the fluid passage. With either type of common valve construction, a significant amount of relative movement of the two elements comprising the valve must be accomplished in order to convert the valve from its fully closed to its fully open position. Moreover, as the valve is partially opened, the rush of fluid out of the restricted opening generally has adverse erosion effects on the elastomeric seal materials which surround the valve opening.

Additionally, in all common forms of valves, the greater the pressure differential that exists across the valve in the closed position, the greater is the force required to effect the opening of the valve, due to the frictional drag of the valve members across the sealing elements in the case of a slide valve, and due to the pressure forces exerted on a poppet valve as it attempts to move away from its seat.

In many fluid valving applications, there is a definite need for a valve which will move from a completely closed to a completely open position with a small amount of relative movement of the two elements of the valve. Moreover, the rapidity of the movement to a fully opened position reduces the tendency of the trapped fluid to rush through the partially opened valve with extreme velocity, thus eliminating the adverse erosive effects encountered in valves of conventional configuration.

There is a particular need for an improved pilot valve for fluid actuators employed in a number of industrial applications. Such pilot valves should be capable of being moved from a fully closed to a fully opened position by a very small relative movement of the valve elements.

Moreover, it is extremely important that there be a minimum of fluid pressure induced resistance to the relative axial movement of the valve elements during the opening or closing movements of the valve elements.

Additionally, when the valve is in its closed position, the fluid outlet passage should preferably be connected to a vent or bleed passage to insure the drainage of all of the operating fluid therefrom prior to the next opening of the valve.

SUMMARY OF THE INVENTION

This invention provides an improved pilot valve capable of being moved from a fully closed to a fully opened position by a slight relative movement of two valve elements. The valve embodying this invention employs an annular flexible diaphragm which has its outer and inner peripheries respectively sealingly secured to outer and inner concentric members which define between them an annular fluid passage. The central portions of the diaphragm are deformed into a generally U-shaped or re-entrant configuration so that the side walls of the U-shaped configuration normally lie in sealing engagement respectively with the inner wall of the outer member and the outer wall of the inner member defining the annular fluid passage. A plurality of apertures are then provided in the diaphragm in the general vicinity of the bight portion of the U-shaped portion of the annular diaphragm. Such apertures are shiftable by a rolling motion from a position in which they are abutting, and sealed by, one of the adjacent walls of the annular passage, to a position where they lie intermediate the walls of the annular passage. Such rolling motion is produced by a relative axial movement of the outer and inner members defining the annular passage. A very limited relative axial movement of the inner and outer members will effect the rolling of the apertures from a fully closed position to a fully opened position, and vice versa. Since a large number of such apertures may be provided around the U-shaped portion of the annular diaphragm, it is apparent that a substantial volume of fluid flow may be readily accommodated through such apertures by this slight relative axial movement of the inner and outer members. Of equal importance is the fact that the pressure differential across the diaphragm has little, if any, frictional effect opposing the relative axial movements of the inner and outer members.

In the specific embodiment of this invention described herein and illustrated in the drawings, the inner and outer members defining the annular conduit with which the valving diaphragm cooperates, are each defined by a plurality of annular blocks which are stacked in axially abutting relationship. The employment of such blocks permits the inner and outer peripheral edges of the annular flexible diaphragm to be conveniently sealed between the abutting faces of the blocks respectively forming the inner and outer members.

Further objects and advantages of the invention will be readily apparent to those skilled in the art from the following detailed description, taken in conjunction with the annexed sheets of drawings.

DESCRIPTION OF THE PREFERRED EMBODIMENTS

Figure 1:
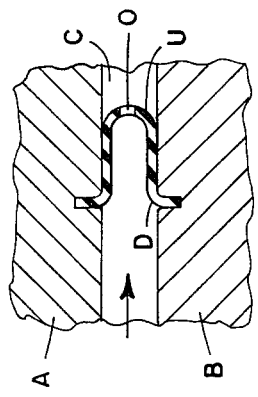
FIG. 1 is a schematic diagram illustrating the basic construction and method of operation of a diaphragm valve in accordance with this invention.

In FIG. 1 there is schematically illustrated the basic principles of this invention. In many instances, it is desirable to effect the flow of fluid, which can be either a gas or a liquid, through an annular conduit C defined between two concentric members A and B which are relatively axially shiftable. In accordance with this invention, a flexible diaphragm D is provided which is of annular configuration and has its outer periphery sealingly anchored in the outer concentric member B and its inner peripheral portion sealingly anchored in the inner concentric member A. The intermediate portions of diaphragm D are either formed or deformed into a generally re-entrant U-shaped configuration U which extends into the annular conduit C and the outer walls of the re-entrant portion U effectively sealingly engage the opposed walls of conduit C. At peripherally spaced intervals along the bight portion of the re-entrant portion U there is provided a plurality of openings O which, when they are located between the walls of the annular conduit C permit unimpeded fluid flow therethrough. However, a slight relative axial movement of the outer member A with respect to the inner member B will effect a rolling of the bight portion U of the flexible diaphragm D to bring the aperture defining portions of such diaphragm into sealing engagement with one of the walls of the annular conduit A. In this position, fluid flow through the annular conduit is completely interrupted and hence a valving action is produced with respect to fluid flow through the annular conduit C through a very slight axial displacement of the inner concentric member B relative to the outer concentric member A.

It should be particularly noted that the existence of a relatively large pressure differential across the diaphragm D has no significant frictional effect in opposing relative axial movement of the inner member B with respect to the outer member A. Moreover, since the apertures O move from a fully opened to a fully closed position, or vice versa, with very limited relative axial movement of the concentric members A and B, there will be no extreme high velocity flow of fluid through the openings in their initial opening positions because they go from fully closed to fully open in such a short time.

It will be noted that this invention includes a new method of controlling fluid flow involving the steps of: forming a portion of a flexible diaphragm into a bulged configuration, with the exterior surface of such bulged portion contacting a wall, applying pressured fluid to the interior of the bulged portion, and then rolling the bulged portion to position an aperture in the bulged portion into and out of contact with the wall.

Figure 3:
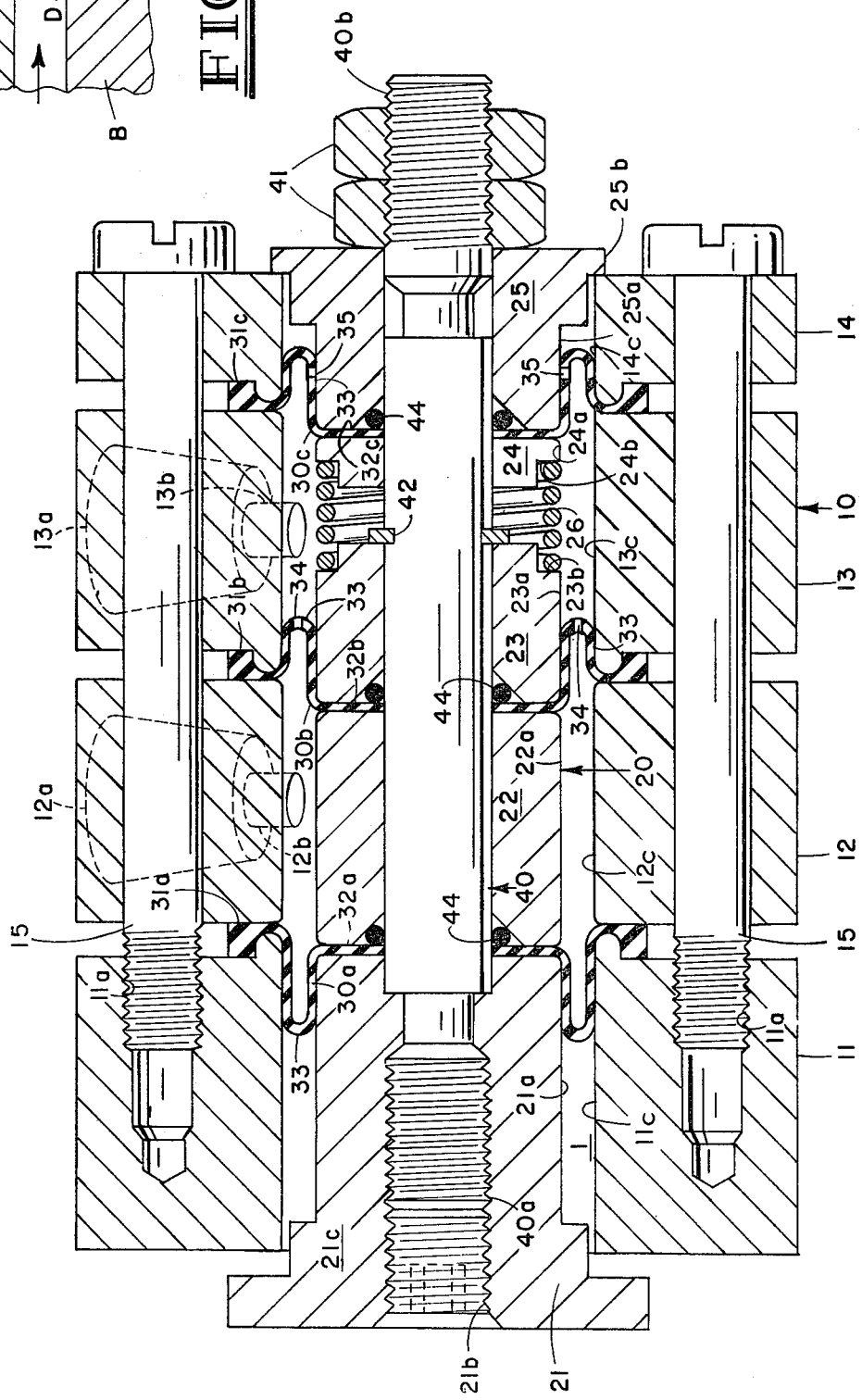
FIG. 3 is a view similar to FIG. 2 but showing the elements of the valve when shifted to the open position.
Figure 2:
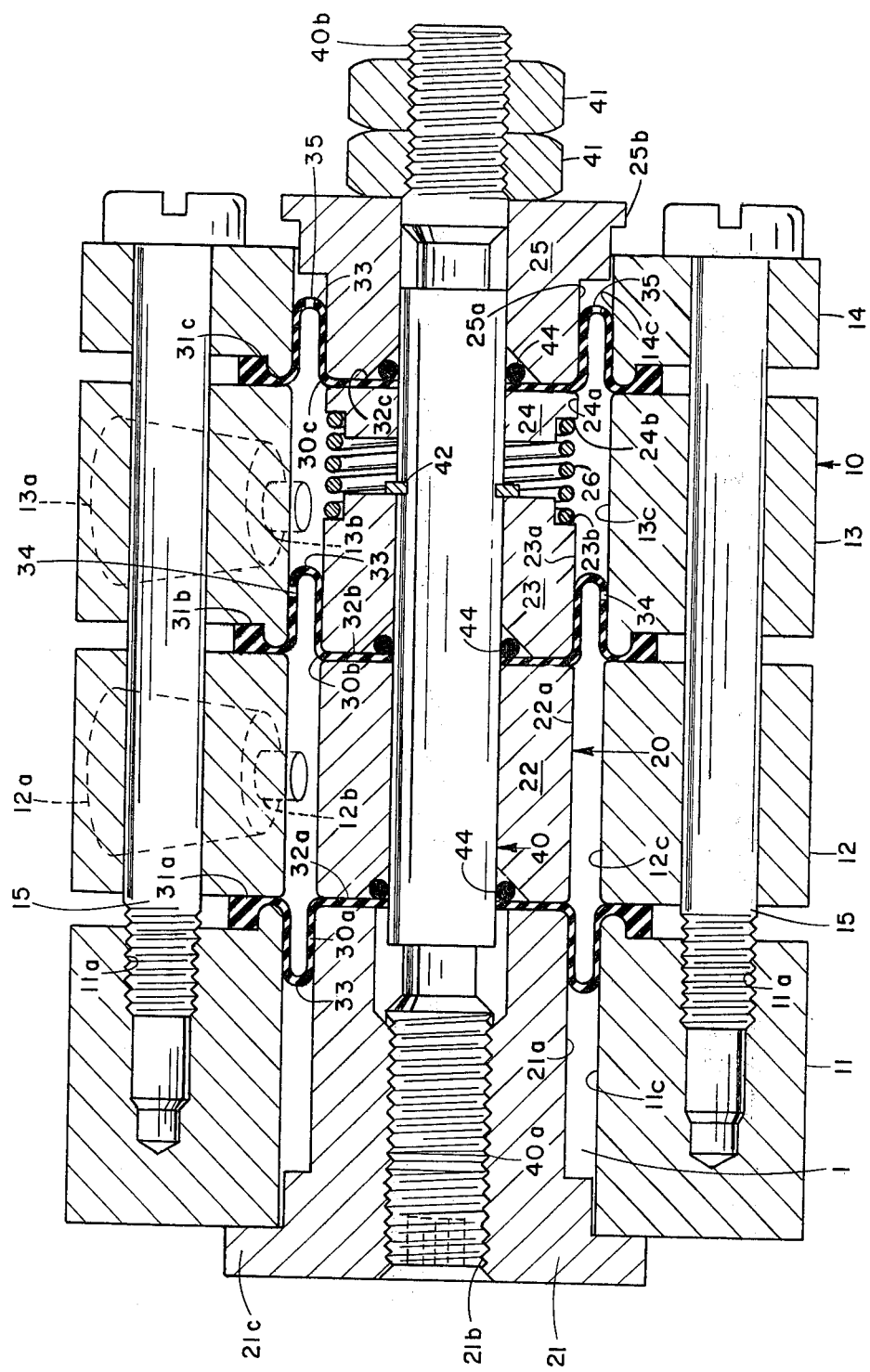
FIG. 2 is an enlarged scale, sectional view of a diaphragm type pilot valve incorporating this invention, with the elements of the valve shown in the valve closed position.

With the basic method and construction of a diaphragm valve in accordance with this invention in mind, attention is now directed to a pilot valve shown in FIGS. 2 and 3 representing an actual valve construction applying the basic principles of this invention. The annular fluid conduit 1 in the pilot valve of FIGS. 2 and 3, which corresponds to the annular conduit C of the schematic diagram of FIG. 1, is defined between the outer annular body 10 and an inner annular body 20. Outer body 10 may be conveniently fabricated by the axially stacked assemblage of a plurality of annular block elements 11, 12, 13 and 14. Block element 11 comprises an end block and has a plurality of peripherally spaced threaded holes 11a to receive therein the threaded ends of clamping bolts 15 which effect the securement of the blocks 11, 12, 13 and 14 in axially stacked relationship. The other outer end block 14 is essentially of washer configuration. Two intermediate blocks 12 and 13 are respectively provided with an inlet port or chamber 12a and an outlet port or chamber 13a which are generally radially disposed with respect to the blocks 12 and 13 and have passages 12b and 13b respectively connecting with the annular passage 1.

The inner body 20 also may be fabricated by the stacked assemblage of a plurality of blocks 21, 22, 23, 24 and 25, all of which are mounted in surrounding relationship to a central actuating shaft 40. Each of the blocks 21, 22, 23, 24 and 25 have external cylindrical surfaces 21a, 22a, 23a, 24a and 25a which are of substantially identical diameter and cooperate with the internal cylindrical surfaces 11c, 12c, 13c and 14c of the outer body 10 to define the annular fluid passage 1.

The spaces between end block 11, inlet block 12, outlet block 13, and end block 14 are respectively utilized to accommodate the enlarged peripheral portions 31a, 31b and 31c of three substantially identical diaphragms 30a, 30b and 30c. Such peripheral portions are tightly clamped between the respective blocks and thus are anchored to the outer body element 10 in fluid sealing relationship.

The inner peripheral portions 32a, 32b and 32c of the annular diaphragms 30a, 30b and 30c are respectively clamped in sealing relationship between the adjacent surfaces of inner blocks 21 and 22, 22 and 23, 24 and 25. Thus the inner peripheral portions of the diaphragms 30a, 30b and 30c are sealingly connected to the inner body 20.

Each diaphragm is provided with an unsecured radially medial portion 33 which is either preformed or is deformed into a re-entrant U-shaped configuration so as to fit snugly between the inner and outer walls of the fluid passage 1. The opening of the re-entrant U-shaped portion 33 is disposed in facing relationship to the higher fluid pressure that will exist across the particular diaphragm. Thus, the diaphragm 30a that is disposed between outer end block 11 and outer block 12 has the U-shaped portion 33 extending in a direction away from the inlet chamber 12a. Similarly, the diaphragm 30b which is disposed between outer blocks 12 and 13 is disposed with the open end of the re-entrant U-shaped portion 33 facing the inlet chamber 12a. The last diaphragm 30c which is disposed between the outer block 13 and the outer end block 14 is disposed with the open end of its re-entrant U-shaped portion 33 facing the exhaust port chamber 13a.

The inner blocks 21, 22, 23, 24 and 25 are secured in assemblage on the actuating shaft 40 by virtue of a threaded end 40a of shaft 40 being engaged in internal threads 21b provided in the end block 21. Additionally, end block 21 has a radially projecting shoulder 21c which will engage the end face of the outer end block 11 upon valve motion. The inner blocks 22, 23, 24 and 25 are each slidably mounted on actuating shaft 40. Blocks 22 and 23 are clamped between a snap ring 42 on shaft 40 and end block 21. End block 25 is adjustably positioned on shaft 40 by a pair of lock nuts 41 which engage the threaded end 40b of actuating shaft 40. The extent of axial movement of the inner block assemblage 20 relative to the outer block assemblage 10 is determined by the axial position of the lock nuts 41 and the cooperation of a radially projecting shoulder 25b provided on the inner end block 25 with the end face of the outer end block 14. A spring 26 is provided which operates against appropriate facing shoulders 23b and 24b of inner blocks 23 and 24 to hold the entire inner block assemblage in a rigid configuration, and more particularly, to apply a clamping and sealing force to the inner perimeter portions 32a, 32b and 32c of the diaphragms. O-ring seals 44 prevents leakage between shaft 40 and end blocks 25, 23 and 22.

The flexible diaphragm 30a that is disposed between the end blocks 11 and 12 is entirely imperforate and therefore acts as an end seal or closure for the annular fluid passage 1.

The diaphragm 30b which is disposed intermediate the inlet passage containing block 12 and the outlet passage containing block 13 is provided with a plurality of peripherally spaced apertures 34. The centers of apertures 34 are disposed at equal distances from the axis of annular passage 1. In the open position of the valve apertures 34 are located in the center of the bight portion of the re-entrant U-shaped portion 33, as shown in FIG. 3, but in the closed position of the valve, as shown in FIG. 2, are located in sealing contact with one of the walls defining the annular fluid passge 1. In the illustrated example, the apertures 34 are shown in sealing contact with the interior wall 13c of the outer block element 13. It is therefore apparent that when the actuating shaft 40 is moved slightly axially to the left, to the position specifically illustrated in FIG. 3, the apertures 34 are shifted from their closed and sealed position to an open position permitting fluid flow along the annular passage 1 from the inlet port or chamber 12a to the outlet port or chamber 13a.

The third diaphragm 30c which is disposed between the outer blocks 13 and 14 is provided in the event it is desired to effect a drainage or venting of the outlet port or chamber 13a during those intervals when the valve is in its closed position. The bight portion 33 of diaphragm 30c is provided with a plurality of apertures 35, but these apertures are disposed in a slightly different spatial relationship on the bight portion 33 than the apertures 34 of diaphragm 30b. Adjusting 41 with respect to 40 will change the relationship of ports 35 to 34, and thus modify the valve stroke or position. Thus, both ports could be closed at the same time or open at the same time during the shifting of the valve shaft 40. In other words, as clearly shown in FIG. 2, when the apertures 34 are in their closed position, the apertures 35 are in their open position, and vice versa. This spatial arrangement is hereinafter referred to as a 180° phase displaced position but it is really due to just a slight radial displacement of the apertures 35 relative to the apertures 34.

Thus, when apertures 34 are closed and the valve element is in its closed position as shown in FIG. 2, the apertures 35 are opened and permit bleeding or venting of any pressurized to the outlet port or chamber 13a. Conversely, when the actuating shaft 40 is moved to the left, the apertures 34 in the flow controlling diaphragm 30b are open and the apertures 35 in the venting diaphragm are closed, as illustrated in FIG. 3.

Figure 4:
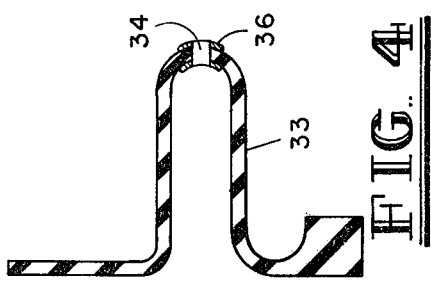
FIG. 4 is an enlarged scale elevational view illustrating the construction of the apertures formed in the diaphragm of the valve of FIG. 2.

The diaphragms 30a, 30b and 30c employed in a valve embodying this invention may be formed entirely from an elastomeric material, but, in order to increase the resistance of such diaphragms to shearing under pressure loads, they are preferably formed of a woven fabric which is then impregnated with a suitable elastomeric material. As specifically illustrated in FIG. 4, the areas around each aperture 34 or 35, as the case may be, is provided with an additional annular ridge or shoulder of elastomeric material 36 in order to improve the sealing of such aperture by contact with one of the adjacent walls of the annular conduit 1.

It will be apparent to those skilled in the art that the actuator shaft 40 may be shifted between its open and closed positions either manually, or electrically by a solenoid, or by an hydraulic actuator. In any event, the actuating shaft 40 need only be moved a slight axial distance to achieve a full opening or closing of the fluid flow through the annular conduit 1 and, when all diaphragms and bores are identical, the pressure differentials across the diaphragms do not exert any significant forces, either by way of direct pressure forces or increased friction, opposing the relative movement of the inner body 20 with respect to the outer body 10.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A fluid pressure valve, comprising: a hollow body; an actuator mounted in the bore of said hollow body for limited axial reciprocating movement relative thereto; an annular chamber defined between the exterior surface of said actuator and the bore of said hollow body; an annular flexible diaphragm; means on said hollow body for sealingly anchoring the outer periphery of said annular diaphragm; means on said actuator for sealingly anchoring the inner periphery of said annular diaphragm, thereby dividing said annular chamber; means for creating a fluid pressure said annular chamber; said diaphragm having an annular re-entrant portion disposed between and concurrently contacting said bore of the hollow body and the exterior surface of said actuator in sealing relation by the pressure force of said fluid pressure differential, said re-entrant portion having at least one aperture therein, each said aperture in said diaphragm being surrounded by an annular ridge of elastomeric material bonded to said diaphragm; said aperture being disposed between said hollow body bore and said actuator relative to said hollow body and being sealingly engaged with one of said hollow body bore and said actuator exterior surface in another axial position of said actuator relative to said hollow body.

2. A fluid pressure valve comprising, a hollow body; an actuator mounted in the bore of said hollow body for limited axial reciprocating movements relative thereto; an annular chamber defined between the exterior surface of said actuator and the bore of said hollow body; means for sealing one axial end of said annular chamber; an annular flexible first diaphragm; means for mounting said first diaphragm in sealing relation across the other end of said annular chamber; said mounting means comprising means on said hollow body for sealingly anchoring the outer periphery of said annular diaphragm, and means on said actuator for sealingly anchoring the inner periphery of said first annular diaphragm; a second annular flexible diaphragm; means for mounting said second annular diaphragm in sealing relationship across said annular chamber at a position intermediate the axial ends thereof; said second mounting means including means on said hollow body for sealingly anchoring the outer periphery of said second annular diaphragm, and means on said actuator for sealingly anchoring the inner periphery of said second annular diaphragm; means for creating a fluid pressure differential between the two sides of said annular chamber divided by said second annular diaphragm, each of said annular diaphragms having an annular re-entrant portion disposed between and concurrently contacting said bore of the hollow body and the exterior surface of said actuator in sealing relation by the pressure force of fluid contacting the respective diaphragm, each said re-entrant portion having at least one aperture therein, said aperture being disposed between said hollow body bore and said actuator in one axial position of said actuator relative to said hollow body and being sealingly engaged with one of said hollow body bore and said actuator exterior surface in another axial position of said actuator relative to said hollow body, said apertures being respectively disposed in phase reversed position wherein the aperture in said first annular diaphragm is in sealing contact with one of said hollow body bore and said actuator exterior surface when the aperture in said second diaphragm is disposed intermediate said hollow body bore and said actuator exterior surface, and vice versa, whereby the axial shifting of said actuator with respect to said hollow body produces a reversal in the open and closed positions of said apertures in said first and second annular diaphragms.

3. The valve of claim 2 wherein each said aperture in each said annular diaphragm is surrounded by an annular ridge of elastomeric material bonded to said diaphragm.

4. The valve of claim 2 wherein said valve body is defined by at least three annular blocks, and means for securing said annular blocks in axially stacked alignment with the outer peripheries of said first and second annular diaphragms respectively clamped between said blocks.

5. The valve of claim 2 wherein said actuator comprises a central shaft, at least three annular blocks mounted on said shaft in axially stacked alignment, and means for securing said annular blocks on said shaft with the inner peripheral edges of said first and second annular diaphragms respectively clamped between said blocks.

6. The valve of claim 2 wherein said valve body is defined by at least three annular outer blocks, means for securing said annular outer blocks in axially stacked alignment with the outer peripheries of each said first and second annular diaphragms respectively clamped between said outer annular blocks, and said actuator comprises a central shaft, at least three annular inner blocks mounted on said shaft in axially stacked alignment and defining said exterior surface of said actuator, and means for securing said annular inner blocks on said shaft with the inner peripheral edges of said first and second diaphragms respectively clamped between said annular inner blocks.

7. The apparatus of claim 2, 3, 4, 5 or 6 wherein the means for sealing the one axial end of said annular chamber comprises an imperforate diaphragm, and means for sealing the outer peripheral portion of said imperforate diaphragm to said body and the inner portion of said imperforate diaphragm to said actuator, said imperforate diaphragm having an annular re-entrant portion disposed between said bore of the hollow body and the exterior surface of said actuator to absorb relative axial movements of said actuator with respect to said hollow body.

8. The valve of claim 4 wherein the means for securing said annular blocks comprises a plurality of peripherally spaced, axially extending bolts.

9. The valve of claim 5 wherein the means for securing said annular blocks on said shaft comprises a nut member secured to one end of said shaft and abutting the adjacent block, and a snap ring mounted in a groove in said shaft and engaging the outer face of the annular block at the other end of the axial stack.

10. A valve for selectively controlling fluid flow between inlet and outlet fluid conduits, comprising: outer and inner concentric members defining the walls of an annular passage adapted for connection between the two conduits; a circular flexible diaphragm having its inner portion sealingly secured to said inner member and its outer portion sealingly secured to said outer member, thereby traversing said annular passage; the unsecured medial portions of said diaphragm being deformed into an annular U-shaped configuration with the open end of the U communicating with said inlet conduit and the side walls of the U-shaped configuration respectively sealingly engaging said walls of said annular passage; at least one aperture in the bight portion of said U-shaped configuration; and means for relatively axially shifting said inner and outer members, thereby selectively rolling the aperture containing portion of the diaphragm into and out of sealing engagement with one of the walls of said annular passage; an annular bleed passage defined by said outer and inner members and communicating with the outlet conduit; a second circular flexible diaphragm having its inner portion sealingly secured to said inner member and its outer portion sealingly secured to said outer member, thereby traversing said annular bleed passage, the unsecured medial portions of said diaphragm being deformed into an annular U-shaped configuration with the open end of the U-shaped configuration communicating with the outlet conduit and the side walls of the U-shaped configuration respectively sealingly engaging said walls of said annular bleed passage; at least one aperture in the bight portion of said U-shaped configuration, whereby relative axial shifting of said inner and outer members selectively rolls the aperture containing portion of said second diaphragm into and out of sealing engagement with one of the walls of said annular bleed passage, said aperture in said second diaphragm being phase displaced from said aperture in said first mentioned diaphragm whereby said second diaphragm aperture is open when said first diaphragm aperture is closed, and vice versa.

11. The valve of claim 10 wherein each of said diaphragm apertures is surrounded by an annular ridge of elastomeric material bonded to said diaphragm.

12. The valve of claim 10 wherein said outer concentric member is defined by a plurality of annular blocks, and means for securing said annular blocks in axially stacked alignment with the outer periphery of said diaphragm clamped between said blocks.

13. The valve of claim 9 wherein said inner member comprises a central shaft, a plurality of annular blocks mounted on said shaft in axial alignment, and means for securing said blocks on said shaft with the inner peripheral edge of said diaphragm clamped between said blocks.

14. The valve of claim 10 wherein said outer member is defined by a plurality of annular outer blocks, means for securing outer blocks in axially stacked alignment with the outer periphery of said diaphragm clamped between said outer blocks, and said inner member comprises a central shaft, a pair of annular inner blocks mounted on said shaft is axially stacked alignment, and means for securing said inner blocks on said shaft with the inner peripheral edge of said diaphragm clamped between said inner blocks.

15. A flexible diaphragm for use in a valve for sealing an annular fluid passage defined between two concentric inner and outer members which are axially movable relative to each other, said flexible diaphragm being fabricated from a fabric material impregnated with an elastomeric material, said flexible diaphragm having a radially medial portion thereof deformed into a re-entrant U-shaped configuration constructed and arranged to snugly fit into the annular passage and sealingly engage the inner walls of the outer member and the outer wall of the inner member, said re-entrant U-shaped portion having a plurality of apertures peripherally spaced around the bight portion thereof, and an annular ridge of elastomeric material formed around the peripheral portion of each of said apertures in said bight portion, thereby permitting the aperture containing portions of the diaphragm to achieve a sealing engagement with one of the walls of the annular fluid passage.

16. A diaphragm as defined in claim 15 wherein said diaphragm is of annular configuration and said apertures are equally spaced from the axis of the annular diaphragm.

* * * * *